United States Patent [19]
Hyde

[11] Patent Number: 5,478,044
[45] Date of Patent: Dec. 26, 1995

[54] ENGINE MOUNT

[76] Inventor: Merle D. Hyde, 1627 E. Palo Verde, Yuma, Ariz. 85365

[21] Appl. No.: 208,457

[22] Filed: Mar. 9, 1994

[51] Int. Cl.⁶ ................................................. F16M 1/00
[52] U.S. Cl. ................................... 248/638; 267/141.6
[58] Field of Search ................................ 248/635, 634, 248/638, 659, 609; 267/141.3, 141.4, 141.5, 141.6

[56] References Cited

U.S. PATENT DOCUMENTS

| | | | |
|---|---|---|---|
| 2,089,383 | 8/1937 | Koerner | 267/141.6 |
| 2,143,739 | 1/1939 | McCabe . | |
| 2,292,536 | 8/1942 | McCabe et al. . | |
| 2,502,313 | 3/1950 | Dodge | 267/141.6 |
| 2,622,836 | 12/1952 | Lee | 267/141.6 |
| 2,911,170 | 11/1959 | Galin et al. . | |
| 2,917,264 | 12/1959 | Hartenstein | 267/141.6 |
| 3,018,990 | 1/1962 | Muller . | |
| 3,263,985 | 8/1966 | Planta | 267/141.6 |
| 4,335,323 | 6/1982 | Kebbon et al. . | |
| 4,491,304 | 1/1985 | Kakimoto | 248/659 X |
| 4,673,156 | 6/1987 | Tabata | 248/638 X |
| 4,679,761 | 7/1987 | Small . | |
| 4,679,778 | 7/1987 | Tabata | 248/659 X |
| 4,761,925 | 8/1988 | Fukahori et al. . | |
| 4,790,520 | 12/1988 | Tanaka | 267/141.3 X |
| 4,830,927 | 5/1989 | Fukahori et al. . | |
| 4,887,788 | 12/1989 | Fischer et al. . | |
| 5,035,395 | 7/1991 | Settlemeier et al. . | |
| 5,092,567 | 3/1992 | Wang | 267/141.4 X |
| 5,221,192 | 6/1993 | Heflin et al. . | |
| 5,282,601 | 2/1994 | Mansell | 248/638 |

FOREIGN PATENT DOCUMENTS 528156  10/1940  United Kingdom .

*Primary Examiner*—J. Franklin Foss
*Attorney, Agent, or Firm*—Richard C. Litman

[57] ABSTRACT

A tubular, resilient engine mount oriented parallel to the rotating power input or output shaft of a power producing or absorbing device. The novel mount yields to, and neither suppresses nor substantially transmits, torsional forces, relying on the self-equilibrating dynamics of the device to return to its original position. The tube attaches at one end to a disc or similar structure which will be fixed to the power device, and at the other end to a disc which will be fixed to the chassis supporting the power device. Axial and shearing forces are resiliently accommodated, and accommodation thereof may be augmented by rigid or resilient solid members located inside or outside the tube. The mount may be provided on only one side of the power device, or both fore and aft. In one alternative embodiment, the discs have a central bore, so that a rotating power shaft may extend through the mount. Provided by a section of pneumatic inner tube, a mount having a diameter of five and one half inches and length of two inches has successfully supported a five pound, two stroke engine operating at 9000 revolutions per minute for over one hundred total hours, without requiring repairs which were needed after only one hour when the engine was conventionally mounted.

6 Claims, 2 Drawing Sheets

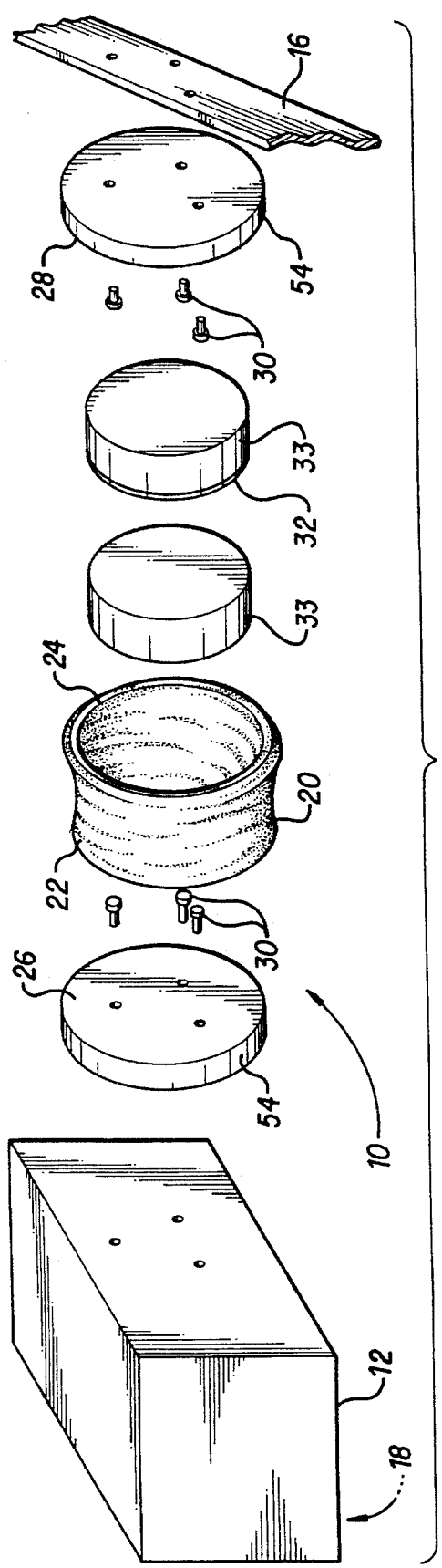
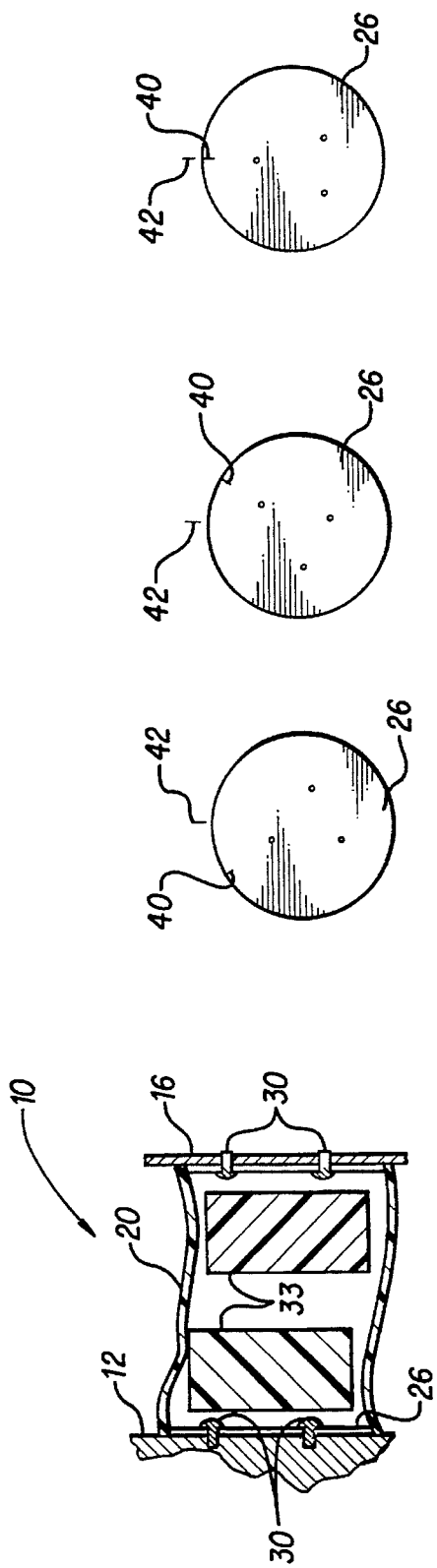
FIG. 1
FIG. 2
FIG. 3
FIG. 4
FIG. 5

ENGINE MOUNT

BACKGROUND OF THE INVENTION

1. Field of the Invention

The present invention relates to an engine mount for supporting an engine or power plant in an engine compartment or the like, and more particularly, to an engine mount which accommodates, rather than suppresses, movement of the engine or power plant arising from torque reactions and the like.

2. Description of the Prior Art

Power producing and power absorbing devices having rotating output and input shafts must be supported in place within their respective structures. Usually, the structure is a machine, and the task becomes both supporting the device, and protecting the balance of the machine from undesirable vibration or other forces originating within the device.

Examples of such devices which are power producers include internal combustion engines and electric motors. Other examples, which encompass power absorbing devices, include air compressors and air conditioning compressors. The forces which originate from the device include torsional, shearing, and axial forces, classified with respect to relationship of the effective direction of the force to the device power input or output shaft. The forces are of greater magnitude in devices having reciprocating pistons, such as piston type internal combustion engines, and piston type compressors, than in devices having pure rotational motion, such as electric motors.

Another factor influencing the magnitude, frequency, and still other characteristics of the undesirable forces is the number of pistons. A single piston device creates the greatest undesirable forces, all other factors being equal. This is because, for each full cycle to be completed, and thus create forces counteracting other forces, two full revolutions of the crankshaft must occur for a four stroke cycle, and one full revolution for a two stroke cycle. As the number of pistons increases, the number of offsetting forces increases for each full revolution, thus muting or offsetting other forces.

In mounting such devices, the prior art generally attempts to address these forces either by suppressing or absorbing them, or by transmitting them to the machine. The latter approach is taken in those few instances wherein power output is more important than longevity of the machine. Examples include race cars, which frequently have engines solidly and unyieldingly mounted to their chassis.

One consequence of this practice is to fatigue the drivers. Under racing conditions, this may be acceptable, but in many other instances, it is not. A motorized appliance, such as a chain saw, may be less desirable to use, less safe, and usable for shorter periods of time, if it imposes this burden on the user. The appliance may therefore provide reduced utility, enjoy less success in the market, and suffer still other disadvantages.

Also, longevity of the device or of certain components will decrease, or the power device may break loose from its associated structure, if subjected to these forces, if the forces are not accommodated properly.

The prior art is replete with many specific situations and proposed solutions, when considering motors and the like.

U.S. Pat. No. 5,221,192, issued to Christopher Heflin et al. on Jun. 22, 1993, exemplifies mounts providing solid rubber feet, and which have metal studs embedded therein. It is a common practice within the air conditioning industry to provide a resilient and elastic pad, in combination with a bolt securing an air conditioning compressor to a supporting structure. A signifcant problem presented by this arrangement, and one addressed by the instant mount, is preventing the bolt from transmitting destructive or undesirable forces from the compressor to the supporting structure.

In U.S. Pat. No. 2,143,739, issued to John J. McCabe on Jan. 10, 1939, a solid block of resilient material surrounds a bushing holding a shaft, instead of a bolt. Shearing and torsional forces are thus resiliently resisted and dissipated.

A pad and bolt type mount which avoids problems arising from the presence of a single bolt passing entire through the pad is seen in U.S. Pat. No. 2,911,170, issued to Robert Galin et al. on Nov. 3, 1959. There are two bolts arranged in line in place of one, each bolt having an enlarged head embedded within the pad. The effect of a single through bolt is provided, but additional flexure is accommodated by provision of two separate bolts, each encased within the resilient pad.

A similar concept is shown in U.S. Pat. No. 2,292,536, issued to John J. McCabe et al. on Aug. 11, 1942.

U.S. Pat. No. 3,018,990, issued to Alfred H. Muller on Jan. 30, 1962, discloses a three point suspension system for an internal combustion engine, employing three bearings of the bolt and pad type.

Bearing assemblies for bearing vertical loads, and for accommodating occasional shear stresses are seen in U.S. Pat. Nos. 4,761,925, and 4,830,927, both issued to Yoshihide Fukahori et al. on Aug. 9, 1988, and May 16, 1989, respectively. The subject bearing assemblies are directed to support of buildings, and resisting earthquakes. The bearings both feature laminations of rigid and elastic plates stacked in repeating patterns. The stack is surrounded by a tubular member for imparting weather resistance. In '927, plural bearings of high and low damping ability are arranged in parallel to provide satisfactory ability to resist an actual earthquake. The instant bearing both isolates its structure from a source of vibration or injurious forces, and damps those forces.

An invention having similar purpose is shown in U.S. Pat. No. 4,887,788, issued to Richard J. Fischer et al. on Dec. 19, 1989. A cylindrical assembly of somewhat complicated internal arrangement of dissimilar elastic, resilient materials is provided. Again, a tubular external member provides environmental protection, and further adds reinforcing strength to the assembly.

U.S. Pat. No. 5,035,395, issued to Brock R. Settlemier et al. on Jul. 30, 1991, describes a cradle assembly built up from components including two stacks of elastic, resilient material.

U.S. Pat. No. 4,335,323, issued to Earl R. Kebbon et al. on Jun. 15, 1982, illustrates a motor bearing opposing both shearing and axial loads imposed upon the output shaft.

None of the above inventions and patents, taken either singly or in combination, is seen to describe the instant invention as claimed.

SUMMARY OF THE INVENTION

Unlike all prior art examples of mounts, wherein the mount is solid material throughout, although not necessarily of homogeneous composition, the present invention suspends the mounted device such that torsional movements, vibrations, and the like are allowed to proceed to the point of self-cancellation. The instant mount neither suppresses nor passes movement and vibration through to the surrounding structure.

Instead, the novel mount flexes to allow vibration, torsion, and other movements, while exerting a small, elastic force urging the power producing or utilizing device back to its original position. This is acceptable since the cyclic dynamics of any selected device will tend on its own to achieve an equilibrium, returning the device to its original state. The novel mount thus accommodates, and does not dissipate or distort, these forces.

The structure that enables this performance is an elastic, resilient tube attached at one end to the device and at the other end to the supporting chassis, arranged parallel to the power shaft of the device.

A section of rubber tubing serves adequately in the capacity of such a mount. The mount is preferably secured to a disc at either end, one disc being attached to the device, and the other disc being fixed to the chassis. A disc enables supporting contact of the tube about the entire periphery thereof, which arrangement leads to symmetrical construction and constant dynamic performance throughout an entire shaft revolution. By contrast, the member supporting the disc could be other than circular, or could have a tube contacting surface which is discontinuous. In this sense, discontinuous signifies that there are areas about the inner circumference of the tube which are not in contact with the disc or its counterpart.

Torsional forces enable the device to rotate about the axis of the power shaft. Total displacement from a reference position may reach twenty-five degrees of arc in either direction, for a total of fifty degrees of rotation. This displacement is unheard of in conventional mounts. Yet the self-equilibrating nature of constant rotary motion both returns the device to its original rotational position, and also does not unduly stress the mount.

Different mounting arrangements are possible. The device may be supported fore and aft by two surrounding tubular mounts. Alternatively, one end of the device may be supported against shearing forces by means other than the novel mount, there being one novel mount on the other side of the device.

Active resistance to forces other than torsional may be incorporated in the novel mount. Axial forces in either direction may be accommodated by elastic deflection of the tube, or may be augmented, as by internal solid or even resilient blocks either surrounding the tube, or located within the tube.

Shearing forces may be accommodated by a predetermined amount of sag of the tube, or a separate solid or even resilient member may be provided to augment resistance to shear.

Operation of the novel mount has proved successful. In a small scale trial, a two stroke, gasoline engine intended for operating a chain saw, manufactured by Sachs-Dolmar, has been satisfactorily suspended at one end by a tube taken from a pneumatic tire inner tube. The inner tube was supported on plywood discs of five and one half inch (14 cm) diameter and three thirty-seconds of an inch (2.4 mm) thickness. The length of the tube was two inches (5 cm). The engine, which weighs about five pounds (2.5 kg), operated at an output of 6.5 HP (5 kW) at 9,000 revolutions per minute when placed in a model airplane, driving the propeller thereof. Over one hundred hours of service free operation was achieved when this phase of experimentation was ceased. Considerably greater operating times without service may be possible. By contrast, a conventionally mounted engine required repairs to correct for wear to linkage components and servos after one hour's operation.

These results were corroborated by accelerometer tests performed on another, small engine, in which the conventionally solid mounted engine imposed forces of approximately 115 Gs upon the airframe, taken about two inches from the crankshaft centerline. When this test was repeated after employing the novel mounting scheme, forces imposed upon the airframe were 4–5 Gs.

Accordingly, it is a principal object of the invention to provide a mount for a power producing or absorbing device having a rotating power shaft, which mount attaches to both the device and to its chassis, and yieldingly accommodates torsional forces.

It is another object of the invention to provide a mount which yieldingly resists shear and axial forces.

It is a further object of the invention to provide a mount which is tubular and parallel to the power shaft of the device.

Still another object of the invention is to provide a mount which is resilient.

An additional object of the invention is to provide a mount which is elastic.

It is again an object of the invention to provide a mount which incorporates additional members resisting shearing forces.

Yet another object of the invention is to provide a mount which incorporates additional members resisting axial forces.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is an exploded, perspective view of the invention, with fragmentary rendering of an associated engine and its chassis.

FIG. 2 is an environmental, side cross sectional view illustrating sag.

FIGS. 3, 4, and 5 are diagrammatic detail views illustrating permissible limits of motor torsion accommodated by the novel mount.

Similar reference characters denote corresponding features consistently throughout the attached drawings.

DETAILED DESCRIPTION OF THE PREFERRED EMBODIMENTS

Figure 6:
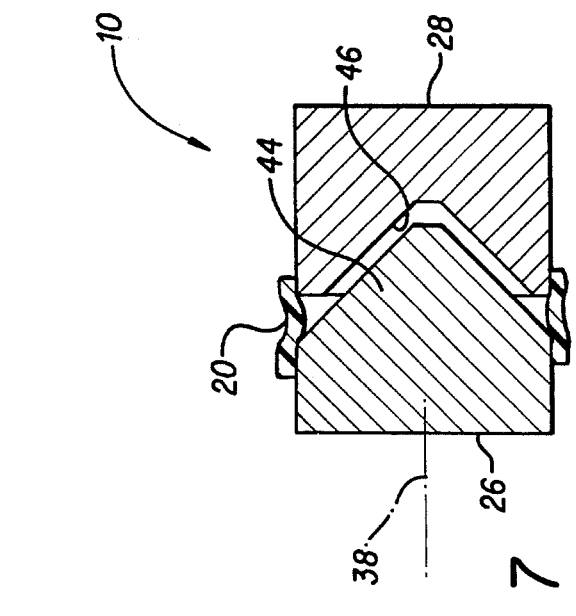
FIG. 6 is an environmental, side cross sectional view of an alternative embodiment of the invention, wherein a power shaft penetrates the novel mount.

Turning now to FIG. 1 of the drawings, the novel mount 10 spans a power device 12, such as an engine, and a member of the chassis 16 of a machine. As employed herein, the term "appliance" will be understood to signify a machine which either provides or absorbs rotary power. Power device 12 could, then, be a device such as an air compressor, for example. Regardless of whether the power device provides or delivers power, it will have a power input or output shaft 18, as is appropriate.

In its simplest form, mount 10 includes a flexible, resilient, preferably elastic tube 20, and two end pieces, or discs. The end pieces serve to anchor tube 20 at one end 22 to power device 12, and at the other end 24 to chassis 16. Discs, which are circular and flat, are a preferred configuration, and this term will be employed to designate end pieces, which of course may assume other configurations. Tube 20 is disposed parallel to the axis of a power shaft (see FIG. 6) of power device.

As seen in FIG. 2, discs 26 and 28 are fixed to power device 12 and chassis by fasteners 30. Tube 20, being flexible and resilient, is easily installed over discs 26 and 28. Contact of tube 20 with discs 26, 28 takes place between a peripheral surface 54 (see FIG. 1) of disc 26 or 28, and the inside surface of tube 20.

The assembly comprising tube 20 and discs 26 and 28 will operate satisfactorily with no further auxiliary structure in some applications. However, where the height of the cylinder of tube 20 must be great, it is possible to place spacers 33 inside tube 20. In this view, two spacers 33 are shown, there also being an antifriction washer 32, which prevents plural spacers 33 from binding on one another. Washer 32 may be a hard, smooth material, such as epoxy laid over a fiberglass base, and ground smooth.

Spacers 33 limit axial compression, and may be dimensioned to resist excessive sag of tube 20. Sag is illustrated in FIG. 2, occurring when one disc 26 or 28 is lower than the other. This may arise from weight of power device 12.

Spacers 33 are shown as solid, in the sense of being free of internal voids, although voids would not change the performance of spacers 33. The material selected may be rigid or resilient. Rigid material is satisfactory in those applications wherein compressive forces are not imposed on mount 10. To resist such forces, where present, without imparting shock to power device 12, it may be desirable to manufacture at least one spacer 33 from a resilient material.

Turning now to FIG. 6, an alternative embodiment of mount 10 is shown wherein discs 26 and 28, and spacer 33, include respective central openings 34,36 which are aligned with power shaft 18 of power device 12. This arrangement enables power shaft 18 to pass through mount 10, in those instances wherein it is desired to locate a mount 10 on the shaft side of power device 12.

Regardless of whether sag and compression are counteracted, torsion of power device 12 is accommodated by allowing it to pivot to a limited degree about axis 38 of power shaft 18. As seen in FIGS. 3 and 4, about twenty-five degrees of torsion is encountered to either side of a neutral position. The neutral position signifies lack of torsion, indicated in FIG. 5, by alignment of an arbitrary benchmark 40 located on power device 12 with another arbitrary benchmark 42 located on chassis 16.

Figure 7:
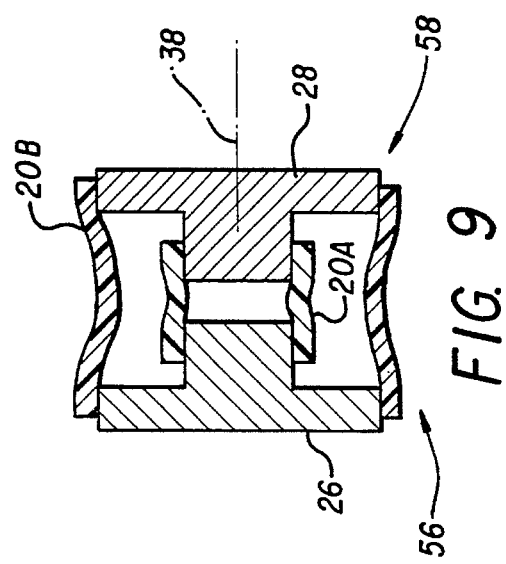
FIGS. 7 and 8 are side cross sectional views of alternative embodiments of the invention wherein discs are designed to resist shearing forces.
Figure 8:
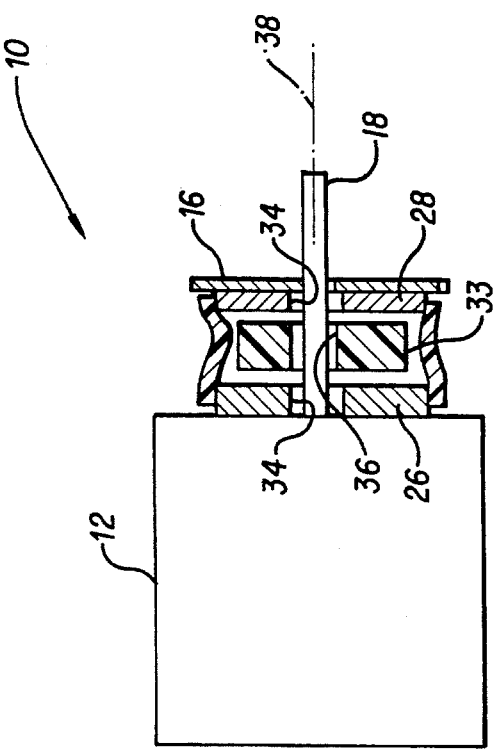

Discs 26,28 may, of course, be configured to cooperate with one another, spacers being unnecessary in this embodiment. This is shown in FIGS. 7 and 8. In the former view, discs 26 and 28 include frustoconical projection 44 and cooperating depression 46, which, when interfit, resist shearing forces imposed on mount 10. Shearing forces include those forces having a component perpendicular to axis 38.

FIG. 8 shows an arrangement wherein discs 26 and 28 still interfit, but have a configuration including a stepped projection 48 and a cooperating depression 50. Also shown in this view are bands 52 which may be placed over tube 20. While resilience of tube 20 may provide satisfactory engagement of discs 26,28, especially considering the tendency of tube 20 to constrict when subjected to elongation or torsion, engagement may be augmented by bands 52. Bands 52 may be constructed as endless loops of resilient material, adjustable bands such as screw operated clamps, as are commonly employed to secure hoses in place, or still other types. Bands 52 constrict on tube 20 about peripheral surface 54 of discs 26,28.

Figure 9:
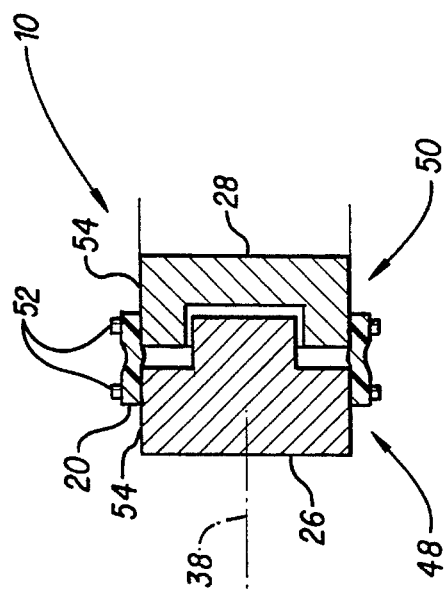
FIG. 9 is a side cross sectional view of an alternative embodiment of the invention having two tubes.

In still another embodiment, illustrated in FIG. 9, plural tubes 20A,20B are fitted to discs 26,28. This arrangement provides additional resilience and strength within a tube 20 of limited length, while still accommodating flexure thereof. Discs 26 and 28 have, in this embodiment, stepped portions 56,58 of differing diameter to accept the two tubes 20A,20B.

It is to be understood that the present invention is not limited to the embodiments described above, but encompasses any and all embodiments within the scope of the following claims.

I claim:

1. A mount for mounting a power device to a chassis of an associated appliance, the power device having a rotating power shaft delivering or absorbing rotary power, the power shaft having an axis, said mount comprising:

a tube made from resilient, elastic material, said tube being oriented parallel to the power shaft of the power device;

a first disc secured to one end of said tube, said first disc being fastened to the power device and including means defining a first opening therein, said first opening being in registry with the axis of the power shaft of the power device;

a second disc secured to the other end of said tube, said second disc being fastened to the chassis and including means defining a second opening therein, said second opening being in registry with said first opening;

at least one internal spacer positioned between said first disc and said second disc, said internal spacer including means defining a third opening therein, said third opening being registry with said first opening and said second opening.

2. The mount according to claim 1, wherein said at least one internal spacer is constructed of a solid material.

3. The mount according to claim 1, wherein said at least one internal spacer is constructed of a rigid material.

4. The mount according to claim 1, wherein said at least one internal spacer is constructed of a resilient material.

5. The mount according to claim 1, further including a second tube disposed interiorly of said tube.

6. The mount according to claim 1, further including a first internal spacer, a second internal spacer, and a third internal spacer, said second internal spacer being positioned intermediate said first internal spacer and said second internal spacer, said first internal spacer and said third internal spacer being constructed of a rigid material, said second internal spacer being constructed of a resilient material.

* * * * *